US012664429B1

(12) United States Patent
Mohammed

(10) Patent No.: US 12,664,429 B1
(45) Date of Patent: Jun. 23, 2026

(54) DEEP NEURAL NETWORKS WITH INTERPRETABILITY

(71) Applicant: Pattern Computer, Inc., Friday Harbor, WA (US)

(72) Inventor: Irshad Mohammed, Redmond, WA (US)

(73) Assignee: Pattern Computer, Inc., Friday Harbor, WA (US)

( * ) Notice: Subject to any disclaimer, the term of this patent is extended or adjusted under 35 U.S.C. 154(b) by 0 days.

(21) Appl. No.: 18/388,343

(22) Filed: Nov. 9, 2023

Related U.S. Application Data

(63) Continuation of application No. 16/417,966, filed on May 21, 2019, now Pat. No. 11,816,564.

(60) Provisional application No. 62/674,310, filed on May 21, 2018.

(51) Int. Cl.
*G06N 3/08* (2023.01)
(52) U.S. Cl.
CPC ..................................... *G06N 3/08* (2013.01)
(58) Field of Classification Search
CPC .. G06N 3/08; G06N 3/04; G06N 3/06; G06N 3/063
See application file for complete search history.

(56) References Cited

U.S. PATENT DOCUMENTS

| | | | |
|---|---|---|---|
| 9,235,799 B2 | 1/2016 | Yu et al. | |
| 2016/0034814 A1 | 2/2016 | Audhkhasi et al. | |
| 2019/0102678 A1* | 4/2019 | Chang | G06N 3/084 |
| 2021/0027140 A1* | 1/2021 | Chollet | G06N 3/08 |

OTHER PUBLICATIONS

Li, Yujian, and Ting Zhang. "Deep neural mapping support vector machines." Neural Networks 93 (2017): 185-194. (Year: 2017).*

* cited by examiner

*Primary Examiner* — Kamran Afshar
*Assistant Examiner* — Brian J Hales
(74) *Attorney, Agent, or Firm* — Cozen O'Connor

(57) ABSTRACT

A feature sub-network trainer improves robustness of interpretability of a deep neural network (DNN) by increasing the likelihood that the DNN will converge to a global minimum of a cost function of the DNN. After determining a plurality of correctly classified examples of a pre-trained DNN, the trainer extracts from the pre-trained DNN a feature sub-network that includes an input layer of the DNN and one or more subsequent sparsely-connected layers of the DNN. The trainer averages output signals from the sub-network to form an average representation of each class identifiable by the DNN. The trainer relabels each correctly classified example with the appropriate average representation, and then trains the feature sub-network with the relabeled examples. In one demonstration, the feature sub-network trainer improved classification accuracy of a seven-layer convolutional neural network, trained with two thousand examples, from 75% to 83% by reusing the training examples.

20 Claims, 7 Drawing Sheets

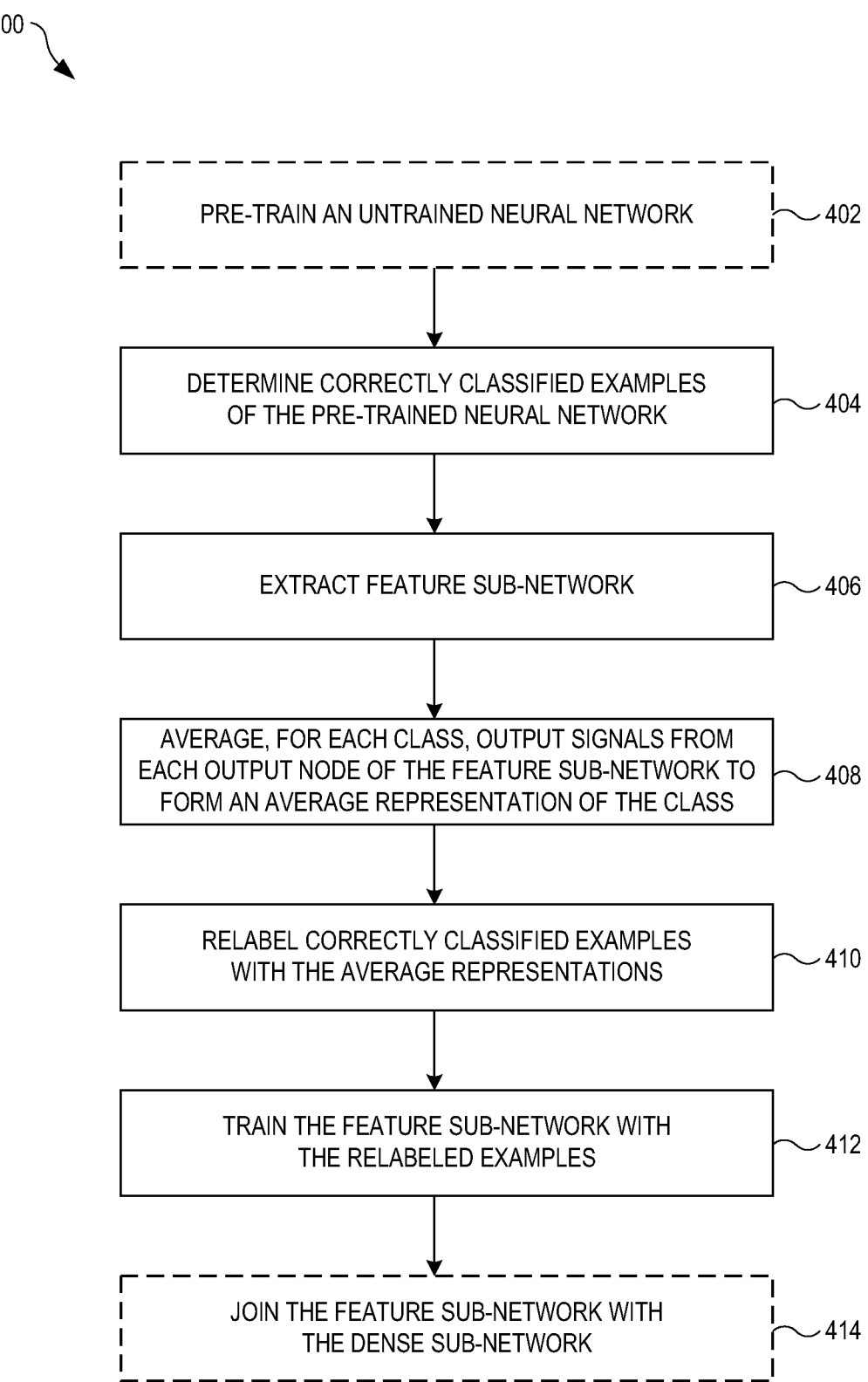

400

PRE-TRAIN AN UNTRAINED NEURAL NETWORK — 402

DETERMINE CORRECTLY CLASSIFIED EXAMPLES
OF THE PRE-TRAINED NEURAL NETWORK — 404

EXTRACT FEATURE SUB-NETWORK — 406

AVERAGE, FOR EACH CLASS, OUTPUT SIGNALS FROM
EACH OUTPUT NODE OF THE FEATURE SUB-NETWORK TO
FORM AN AVERAGE REPRESENTATION OF THE CLASS — 408

RELABEL CORRECTLY CLASSIFIED EXAMPLES
WITH THE AVERAGE REPRESENTATIONS — 410

TRAIN THE FEATURE SUB-NETWORK WITH
THE RELABELED EXAMPLES — 412

JOIN THE FEATURE SUB-NETWORK WITH
THE DENSE SUB-NETWORK — 414

DEEP NEURAL NETWORKS WITH INTERPRETABILITY

RELATED APPLICATIONS

This application is a continuation of U.S. patent application Ser. No. 16/417,966, filed on May 21, 2019, which claims priority to U.S. Provisional Patent Application No. 62/674,310, filed on May 21, 2018. Each of these applications is incorporated herein by reference in its entirety.

BACKGROUND

An artificial neural network (ANN) is a computing system that uses a collection of interconnected nodes to learn a function via supervised learning. Inspired by biology, the nodes of an ANN represent neurons while the connections between the nodes mimic synapses that transmit electrical signals between biological neurons. Nodes in an ANN may be grouped into a plurality of interconnected layers, the nodes forming each layer operating in parallel. An ANN may have an input layer whose nodes receive inputs signals that serve as inputs to the learned function, and an output layer whose nodes transmit output signals corresponding to outputs of the learned function. An ANN may also have one or more hidden layers between the input and output layers that transform the input signals into output signals.

A deep neural network (DNN) is an ANN with multiple hidden layers. DNNs are powerful because a greater number of hidden layers allows for higher levels of abstraction, therefore allowing more complex functions to be learned. However, additional layers increase the number of parameters of the DNN (i.e., weights and biases), and the corresponding increase in computational resources needed to train these extra parameters may make training unfeasible or prohibitively costly.

A convolutional neural network (CNN) is one type of DNN that contains at least one layer that performs mathematical convolutions on its inputs. CNNs are widely used for image processing because the convolution layers mimic the arrangement and behavior of sensory neurons (e.g., retinal ganglion cells) and cortical neurons in the visual systems of organisms. Convolutional layers also reduce the number of parameters in the network by tiling the input image, thereby allowing deeper networks to be constructed and trained in a feasible time.

Applications that may benefit from DNNs, including CNNs, include speech recognition, vehicle control (e.g., self-driving cars and unmanned vehicles), medical diagnosis (e.g., visual interpretation of X-ray images), facial recognition, machine translation, decision-making, and game-playing (e.g., AlphaGo).

SUMMARY

With millions of parameters, or more, forming a highly non-linear mathematical space, deep neural networks (DNNs) excel at complex learning and predicting. However, these capabilities come with the drawback of hindered interpretability, i.e., it is difficult to understand how a DNN arrives at its conclusions. Referred to as the "black box" problem of interpretability, this opaqueness impedes progress in the development and deployment of DNNs by preventing researchers and users from identifying underlying causes behind inaccurate predictions/results outputted by DNNs. In turn, trust in DNNs erodes, and their adaptation in many applications is hindered, particularly in regulated industries like banking and insurance where companies may be required to provide explanations behind their business decisions.

A trained DNN is interpretable in the sense that for a given input, it is possible to trace backwards through layers of the DNN to understand how changes to the input affect the output. Such tracing through layers helps address the black box problem described above, but only if the DNN has converged, via training, to the true global minimum of its corresponding cost function. There is no guarantee that a DNN will converge to this global minimum. This problem is exacerbated as the dimensionality of the DNN parameter space increases (i.e., the total number of weights and biases), as the cost function forms an increasing number of local minima into which the DNN may converge. Given the high dimensionality of the parameter space, visualizing the cost function to identify the global minimum from the various local minima is unfeasible.

One way to differentiate between global and local minima of the cost function of a DNN is to train the DNN several times using different initial values of the parameters for each training run. Ideally, the DNN will converge to the same minimum, regardless of the initial values. A DNN meeting this condition is called "robust," and a robust DNN may be identified by the fact that each parameter converges to the same final value regardless of its initial value. However, when the DNN is not robust, each parameter may converge to a different value with each training run, indicating that the DNN is converging to different local minima. Each local minimum gives rise to a different interpretation of the DNN. As there is no reason for the interpretation of a DNN to depend on how initial values of the parameters are selected, non-robust DNNs are harder to interpret than robust DNNs, and may even be uninterpretable.

Described herein is a feature sub-network trainer that advantageously improves robustness of a DNN by training the DNN in a manner that increases the likelihood that it converges to the true global minimum of its cost function. The feature sub-network trainer splits a pre-trained DNN into feature and dense sub-networks. The feature sub-network is formed from an input layer (i.e., the first layer of the DNN), and one or more subsequent hidden layers, of the DNN. The dense sub-network is formed from all other layers of the DNN, including an output layer of the DNN (i.e., the last layer of the DNN). The feature sub-network trainer implements additional training of the feature sub-network to improve its accuracy at identifying and extracting features in inputted data. Advantageously, the feature sub-network has significantly fewer dimensions than the full DNN from which it is extracted. Thus, the feature sub-network has a cost function with a much simpler topology than that of the full DNN, reducing the number of local minima into which the feature sub-network may inadvertently converge. After the additional training, the feature sub-network may be recombined with the dense sub-network to form a feature-trained DNN that is similar to the original DNN, but is advantageously more likely to have fully converged to the true global minimum of the DNN's cost function, thereby aiding interpretability of the DNN.

One difficulty frequently encountered when training DNNs is known as the vanishing gradient problem. Many DNNs are trained via backpropagation, which calculates the gradient of DNN's cost function with respect to each DNN parameter, and updates the DNN parameter with a gradient descent algorithm that uses a step size proportional to the calculated gradient. However, the calculated gradient gets increasingly smaller when the parameter is located increasingly toward the input layer and farther from an output layer. Therefore, parameters closer to the input layer converge more slowly than parameters closer to the output layer. Equivalently, nodes of the input layer learn the slowest, while nodes of the output layer learn the fastest.

Many DNNs, including some convolutional neural networks (CNNs), have one or more layers that are fully connected (FC), i.e., each node in a FC layer is connected to every node in the preceding layer. A convolutional layer, on the other hand, is one example of a layer that is sparsely connected (SC), or not fully connected. FC layers are usually located closer to the output layer, and may include the output layer. On the other hand, SC layers are usually located closer to the input layer, and may include the input layer. Due to their greater number of connections between nodes, FC layers require a greater number of weights than SC layers, and therefore may consume most of the computational resources needed to train a DNN. For example, AlexNet is one CNN known in the art that uses five SC convolutional layers connected to three FC layers to process images having 227×227 pixels. The SC convolutional layers collectively have 2.3 million weights while the FC layers collectively have 58.6 million weights. Another CNN known in the art is VGG-16, which processes images with 224×224 pixels using thirteen SC convolutional layers followed by three FC layers; the SC convolutional layers collectively have 14.7 million weights while the FC layers collectively contain 124 million weights.

One aspect of the present embodiments is the realization that, due to the vanishing gradient problem, FC layers do not need as much training as SC layers for the purpose of identifying and extracting features of input data. That is, FC layers can be trained with fewer training examples than SC layers to achieve a selected level of classification accuracy. Accordingly, the feature sub-network trainer described herein splits a pre-trained DNN so that the feature sub-network is formed primarily, or exclusively, of SC layers, while the dense sub-network is formed primarily, or exclusively, of FC layers. The feature sub-network trainer may train the feature sub-network using the same training examples used to pre-train the DNN. The SC layers benefit from this additional training, thereby improving the accuracy with which they identify and extract features in inputted data. Alternatively, the feature sub-network may use different and/or additional training examples than those used to pre-train the DNN.

Since the feature sub-network may contain only 10%, or less, of the total number of DNN parameters, the feature sub-network trainer can advantageously train the feature sub-network much faster than the full DNN from which it is extracted. In addition, the feature sub-network trainer may advantageously reduce the number of training examples needed to pre-train the DNN, thereby reducing the overall training time needed to achieve a selected level of classification accuracy with the final feature-trained DNN. This benefit stems from the fact, described above, that the majority of DNN parameters are in the FC layers, and thus these FC layers consume the bulk of computational resources during DNN training.

In one embodiment, a deep neural network classification method includes determining a plurality of correctly classified examples of a pre-trained neural network. The method also includes extracting, from the pre-trained neural network, a feature sub-network having a plurality of sub-network output nodes. The method also includes averaging, for each class identifiable by the pre-trained neural network, a plurality of output signals from each of the sub-network output nodes to form an average representation of the class, each of the output signals being generated by inputting one of the correctly classified examples of the class into the feature sub-network. The method also includes forming a plurality of relabeled examples by relabeling each correctly classified example with the average representation of the class to which the correctly classified example belongs. The method also includes training the feature sub-network with the relabeled examples.

In another embodiment, a deep neural network classification system includes storage configured to store a pre-trained deep neural network, a processor, and a sub-network training engine, implemented as machine-readable instructions stored in a memory in electronic communication with the processor. The sub-network training engine controls the system to determine a plurality of correctly classified examples of the pre-trained neural network, and extract, from the pre-trained neural network, a feature sub-network having a plurality of sub-network output nodes. The sub-network training engine further controls the system to average, for each class identifiable by the pre-trained neural network, a plurality of output signals from each of the sub-network output nodes to form an average representation of the class, each of the output signals being generated by inputting one of the correctly classified examples of the class into the feature sub-network. The sub-network training engine further controls the system to form a plurality of relabeled examples by relabeling each correctly classified example with the average representation of the class to which the correctly classified example belongs. The sub-network training engine further controls the system to train the feature sub-network with the relabeled examples.

BRIEF DESCRIPTION OF THE FIGURES

FIG. 4 is a flow chart illustrating a method for improving robustness of a pre-trained neural network, in embodiments.

DETAILED DESCRIPTION

Figure 1:
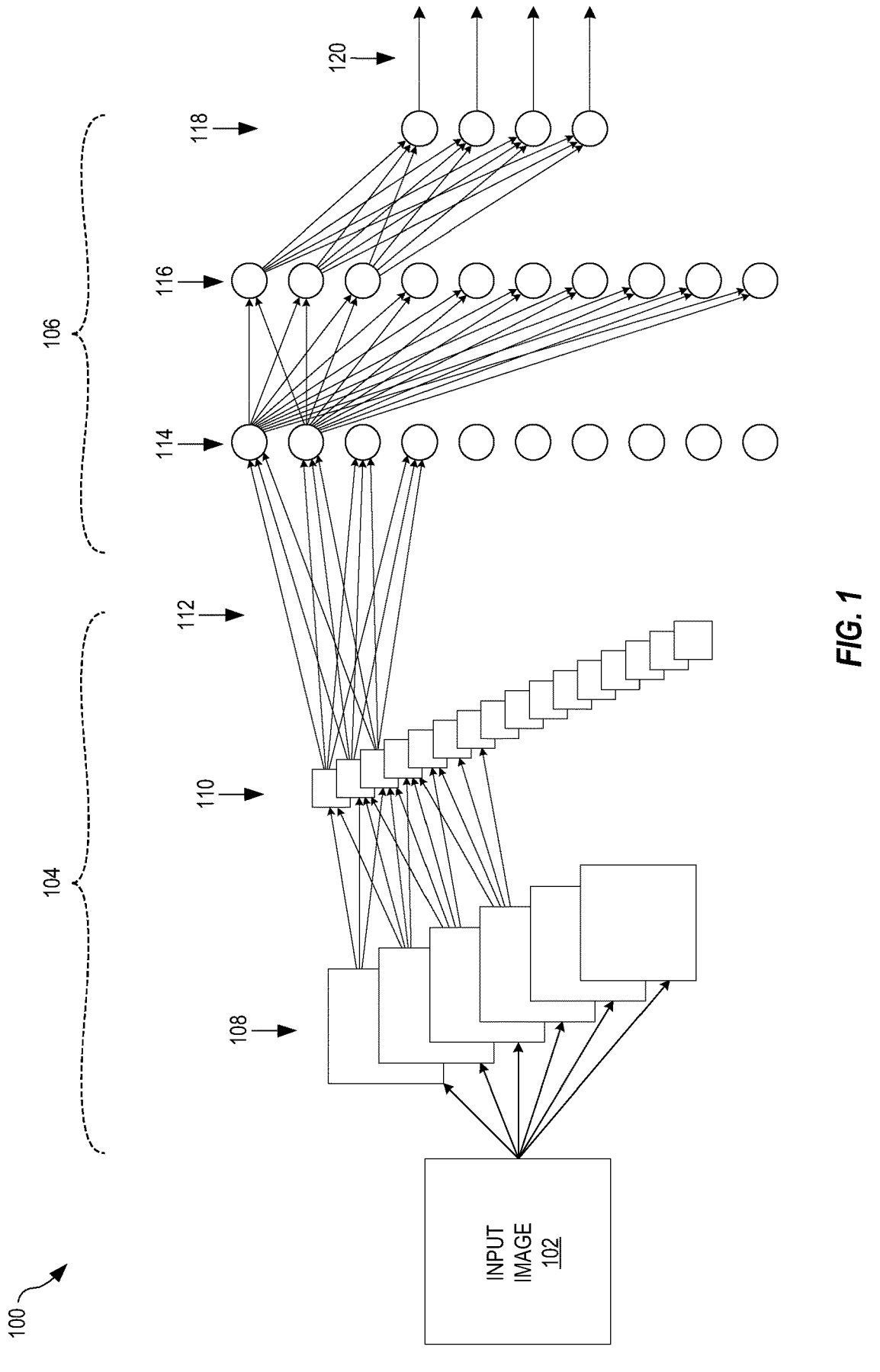
FIG. 1 shows one example of a feedforward deep neural network (DNN) that may benefit from embodiments described herein.

FIG. 1 shows one example of a feedforward deep neural network (DNN) 100 that may benefit from embodiments described herein. DNN 100 is depicted as a convolutional neural network (CNN) having a plurality of sparsely-connected (SC) layers 104 and a plurality of fully-connected (FC) layers 106. SC layers 104 include an input layer 108 that receives an input image 102, and a first hidden layer 110. FC layers 106 include a second hidden layer 114, a third hidden layer 116, and an output layer 118 that generates output signals 120. Each of output signals 120 may represent, for example, a probability that input image 102 belongs to one of a plurality of classes that DNN 100 has been trained to identify.

As shown in FIG. 1, layers 104 and 106 are connected in sequence. Each hidden layer of DNN 100 (e.g., first, second, and third hidden layers 110, 114, and 116, respectively) therefore receives data from a preceding layer and outputs data to a succeeding layer. Herein, the flow of data from one layer to the next is referred to as "feeding." Specifically, one layer feeds a succeeding layer when the outputs of nodes forming the one layer connect to the inputs of nodes forming the succeeding layer. For clarity, input layer 108 is included as one of SC layers 104, even though it receives external data (e.g., input image 102) as opposed to data from another layer of DNN 100.

Arrows between layers in FIG. 1 indicate the flow of data through DNN 100. For example, arrows 112 show how the nodes of first hidden layer 110 link to the nodes of second hidden layer 114. For clarity, not all arrows are shown in FIG. 1, and therefore it should be appreciated that each node in each of FC layers 106 (e.g., second and third hidden layers 114, 116, and output layer 118) receives inputs from all the nodes of the preceding layer. For example, each node of second hidden layer 114 receives sixteen inputs, one from each of the sixteen nodes of first hidden layer 110.

In FIG. 1, input image 102 is fed into each node of input layer 108, which in turn feeds first hidden layer 110. While input layer 108 and first hidden layer 110 are shown in FIG. 1 as convolutional layers having six and sixteen nodes, respectively, input layer 108 and/or first hidden layer 110 may have more or fewer nodes without departing from the scope hereof. While SC layers 104 is shown in FIG. 1 having two layers, SC layers 104 may have more or fewer layers without departing from the scope hereof. For example, SC layers 104 may be formed from only input layer 108, wherein SC layers 104 has no hidden layers.

In FIG. 1, first SC hidden layer 110 feeds second FC hidden layer 114, which feeds third FC hidden layer 116, which in turn feeds FC output layer 118. While second hidden layer 114, third hidden layer 116, and output layer 118 are shown in FIG. 1 having ten, ten, and four nodes, respectively, second hidden layer 114, third hidden layer 116, and output layer 118 may have more or fewer nodes without departing from the scope hereof. While FC layers 106 is shown in FIG. 1 having three layers, FC layers 106 may have more or fewer layers without departing from the scope hereof. For example, FC layers 106 may be formed from only output layer 118, wherein FC layers 106 has no hidden layers.

While DNN 100 is shown in FIG. 1 having five layers, DNN 100 may have up to thousands of layers, or more, without departing from the scope hereof. In addition, SC layers 104 need not be formed, either exclusively or partially, from convolutional layers. SC layers 104 may include pooling layers, nonlinear layers, normalization layers, loss layers, and other types of layers, without departing from the scope hereof. In one embodiment, DNN 100 contains no convolutional layers. DNN 100 may be implemented with various types of activation functions, such as a rectified linear unit (ReLU), hyperbolic tangent, or sigmoidal function.

DNN 100 may be generated by training an untrained neural network with a training set having a plurality of training examples, each labeled according to one of a plurality of classes that the untrained neural network will be trained to identify. For example, the parameters of the untrained neural network may be updated by a gradient descent algorithm that minimizes a cost function of the untrained neural network. Gradients used by the gradient descent algorithm may be calculated via backpropagation.

Figure 2:
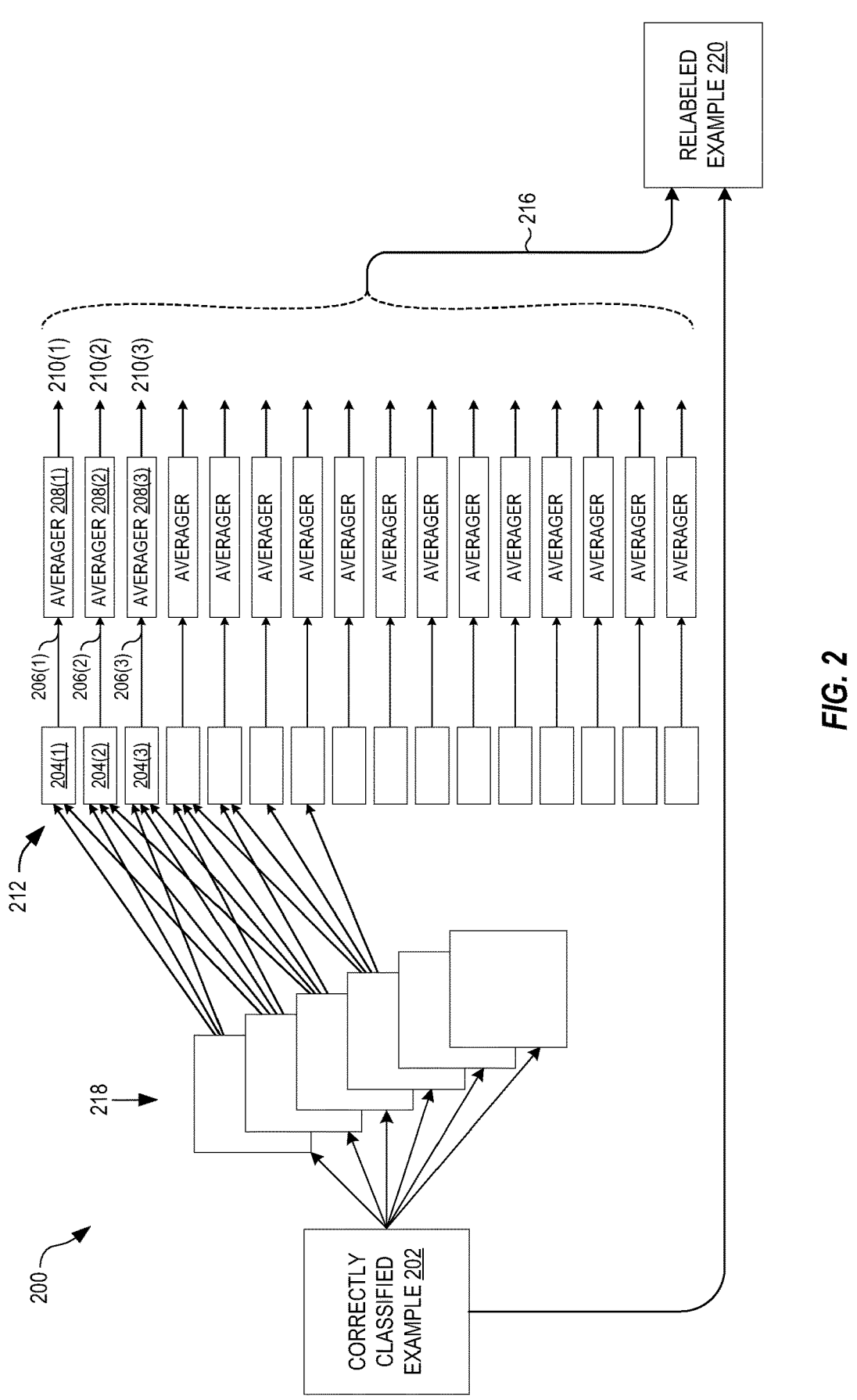
FIG. 2 shows one example of a feature sub-network extracted from the DNN of FIG. 1, in an embodiment.

FIG. 2 shows one example of a feature sub-network 200 extracted from DNN 100 of FIG. 1. Feature sub-network 200 is formed from SC layers 104 extracted from DNN 100. Specifically, feature sub-network 200 includes an input layer 218 and an output layer 212 that are identical to (i.e., same weights and connections) input layer 108 and SC first hidden layer 110 of DNN 100, respectively. Thus, feature sub-network 200 is initially pre-trained since it is extracted from DNN 100 that is pre-trained.

Output layer 212 includes a plurality of sub-network output nodes 204 that generate corresponding feature signals 206 when input layer 218 receives an image. Feature sub-network 200 is "extracted" from DNN 100 in the sense that feature signals 206 are accessed for processing, regardless of whether feature signals 206 are subsequently fed to second hidden layer 114 of DNN 100. Layers of DNN 100 not included in feature sub-network 200 (i.e., second hidden layer 114, third hidden layer 116, and output layer 118) form a dense sub-network.

FIG. 2 shows a correctly classified example 202 being fed to input layer 218. Correctly classified example 202 is one image that, when inputted to DNN 100, generates output signals 120 that correctly identify the class associated with the one image. For example, the class may be correctly identified when a probability, as represented by one of output signals 120, that the image belongs to the correct class exceeds a pre-determined threshold (e.g., 0.9). Correctly classified example 202 may be one training example used to train DNN 100. In this case, when the one training example is fed into DNN 100, output signals 120 may be compared to a corresponding label of the training example to determine if DNN 100 correctly identified the inputted training example. Alternatively, correctly classified example 202 may be an observation without a corresponding label. In this case, when the observation is fed into DNN 100, independent verification is needed to confirm that output signals 120 correspond to the correct class of the inputted observation.

FIG. 2 also shows a plurality of averagers 208 that average corresponding feature signals 206 to generate corresponding averaged feature signals 210. Feature signals 206 change with each new correctly classified example 202 fed into feature sub-network 200. When a plurality of correctly classified examples, all of the same class, are fed into feature sub-network 200, each averager 208 averages the corresponding output signal 206 into one of the averaged feature signals 210. The set of averaged feature signals 210 is an average representation 216 of the class that serves as a unique signature of the class. Thus, average representation 216 may be used to label every example belonging to the class. For example, average representation 216 may be used to relabel correctly classified example 202 into a relabeled example 220, as shown in FIG. 2.

The generation of average representation 216 depicted in FIG. 2 may be repeated for each of a plurality of classes identifiable by DNN 100 (i.e., that DNN 100 was trained to identify), thereby forming a plurality of average representations corresponding to the plurality of classes. Each of the average representations is generated from several correctly classified examples of the corresponding class, and each of these correctly classified examples is then relabeled with the corresponding average representation. Thus, this process generates a plurality of sets of relabeled examples, each of the sets corresponding to one of the classes.

After the correctly classified examples are relabeled with the average representations, feature sub-network 200 is trained using the plurality of sets of relabeled examples. For example, the parameters of the feature sub-network 200 may be updated by a gradient descent algorithm that minimizes a cost function of feature sub-network 200. Gradients used by the gradient descent algorithm may be calculated via backpropagation. The training may alternatively use another type of optimization/training algorithm known in the art without departing from the scope hereof.

In some embodiments, feature sub-network 200 is not formed exclusively of SC layers 104. For example, feature sub-network 200 may be formed by combining all SC layers 104 with one or more of subsequent FC hidden layers 106. Alternatively, feature sub-network 200 may include only some of SC layers 104, wherein the dense sub-network includes one or more of SC layers 104.

Figure 3:
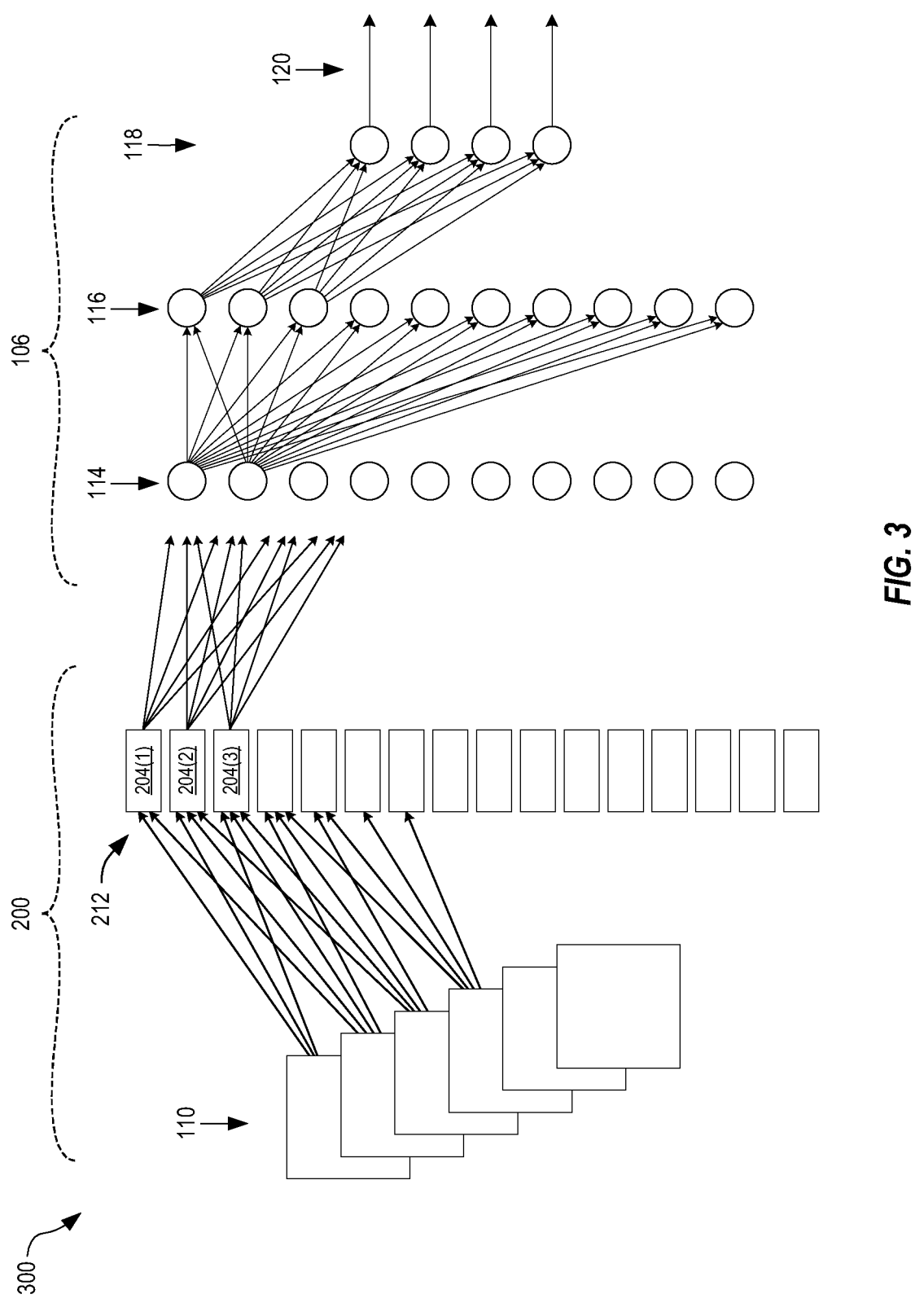
FIG. 3 shows the feature sub-network of FIG. 2 being joined with a dense sub-network to form a feature-trained DNN that is similar to the DNN of FIG. 1 except that the feature-trained DNN has a higher classification accuracy than the DNN of FIG. 1, in an embodiment.

FIG. 3 shows feature sub-network 200 being joined with the dense sub-network (i.e., FC layers 106 of DNN 100) to form a feature-trained DNN 300 that is similar to DNN 100 except that feature-trained DNN 300 has a higher classification accuracy than DNN 100. Feature sub-network 200 is joined to second hidden layer 114 to replicate the data flow of DNN 100 (as represented by arrows 112 of FIG. 1). Thus, in FIG. 3, each sub-network output node 204 is connected to every node of second hidden layer 114.

FIG. 4 is a flow chart illustrating a method 400 for improving robustness of a pre-trained neural network (e.g., DNN 100). Method 400 includes a step 404 to determine a plurality of correctly classified examples of the pre-trained neural network. In one embodiment, step 404 includes a first step of inputting a plurality of input examples to the pre-trained neural network, and a second step of comparing, for each inputted example, a corresponding output of the pre-trained neural network to a label of the inputted example. When the output of the pre-trained neural network matches the label, the inputted example is a correctly classified example. The inputted examples may be the same training examples used to pre-train the pre-trained neural network (e.g., see step 402), thereby advantageously reducing the number of examples needed to implement method 400.

Method 400 also includes a step 406 to extract, from the pre-trained neural network, a feature sub-network having a plurality of sub-network output nodes. In one example of step 406, SC layers 104 of DNN 100 are extracted from DNN 100 to form feature sub-network 200. SC layers 104 of DNN 100 may be copied to form feature sub-network 200, thereby preserving DNN 100. Alternatively, feature sub-network 200 may be formed directly from SC layers 104 (e.g., as stored in memory), wherein changes to feature sub-network 200 (e.g., see step 412 below) do not preserve DNN 100. In one embodiment, step 406 extracts the feature sub-network of the pre-trained neural network by selecting one hidden layer of the pre-trained neural network to serve as an output layer of the feature sub-network. In the example of FIGS. 1 and 2, first hidden layer 110 is selected, wherein feature sub-network 200 is formed from SC layers 104, and the dense sub-network if formed from FC layers 106.

Method 400 also includes a step 408 to average, for each class identifiable by the pre-trained neural network, a plurality of output signals from each of the sub-network output nodes to form an average representation of the class, each of the output signals being generated by inputting one of the correctly classified examples of the class into the feature sub-network. In one example of step 408, averagers 208 average corresponding feature signals 206 outputted by sub-network output nodes 204 when a plurality of correctly classified examples is inputted to feature sub-network 200. Averagers 208 output averaged feature signals 210 that collectively form one average representation 216.

Method 400 also includes a step 410 to form a plurality of relabeled examples by relabeling each correctly classified example with the average representation of the class to which the correctly classified example belongs. In one example of step 410, correctly classified example 202 of FIG. 2 is relabeled with average representation 216.

Method 400 also includes a step 412 to train the feature sub-network with the relabeled examples. In one example of step 412, feature sub-network 200 is trained with relabeled example 220. In one embodiment, the feature sub-network is trained in step 412 via backpropagation. However, the training in step 412 may use another type of optimization/training algorithm without departing from the scope hereof.

In one embodiment, method 400 includes a step 414 to join the feature sub-network, after the training of step 412, with a remaining dense sub-network of the pre-trained neural network. In one example of step 414, feature sub-network 200 is joined with the dense sub-network formed by layers 114, 116, and 118 of DNN 100 to generate feature-trained DNN 300 of FIG. 3.

In one embodiment, method 400 includes a step 402 to generate the pre-trained neural network by pre-training an untrained neural network with a plurality of pre-training examples. Pre-training may use backpropagation, gradient descent, or another type of optimization/training algorithm known in the art. The pre-training examples may be the input examples described above for step 404.

In another embodiment, the pre-training examples are split into a first portion and a remaining second portion. In step 402, the first portion is used to pre-train the untrained neural network, and in step 404, the second portion is used as the input examples to determine the correctly classified examples.

In another embodiment, the untrained neural network is pre-trained in step 402 to a selected level of classification accuracy. For example, the untrained neural network may be trained until the training accuracy, as determined by the pre-training examples or separate test data, exceeds 70%. This embodiment minimizes pre-training of DNN 100 by stopping pre-training once the dense sub-network (e.g., FC layers 106) has been trained adequately for classifying input data (e.g., input image 102). Since training FC layers 106 may utilize significantly more computational resources than training SC layers 104, minimizing pre-training of DNN 100 advantageously speeds up training of feature-trained DNN 300 (i.e., method 400) and makes more efficient use of the pre-training examples.

Demonstration

Techniques described herein were successfully implemented with a seven-layer CNN used to classify images of dogs and cats. The CNN included four SC convolutional layers collectively forming a feature sub-network (e.g., SC layers 104 of FIG. 1), and two hidden FC layers and an output layer collectively forming a dense sub-network (e.g., FC layers 106). One of the four convolutional layers served as an input layer (e.g., input layer 108) that received color images having 224×224 pixels, each pixel containing red, green, and blue values. The output layer contained two nodes, one outputting the probability that the input image represents a "dog" and the other outputting the probability that the input image represents a "cat."

The CNN was pre-trained with a pre-training data set of two thousand pre-training examples (e.g., step 402 of method 400), half of which were labeled "dog" and the remaining half of which were labeled "cat." A test data set of eight hundred test examples was used to validate pre-training; half of the test examples were labeled "dog" and the remaining half were labeled "cat." From the test data set, the classification accuracy of the pre-trained CNN was found to be 75%. This classification accuracy was achieved with conventional (pre-) training of the CNN, and therefore serves as a baseline against which improvements from the embodiments disclosed herein may be compared.

Correctly classified pre-training examples were then obtained from the pre-training data set by identifying pre-training examples that were correctly classified by the pre-trained CNN (e.g., step 404 of method 400). The CNN was then split between the fourth and fifth layers, i.e., the feature sub-network was extracted from the CNN (e.g., step 406 of method 400). Each correctly classified pre-training example labeled "dog" was inputted to the feature sub-network, and a corresponding output of each output node of the feature sub-network was averaged over all the correctly classified pre-training examples (e.g., step 408 of method 400). The output layer of the feature sub-network contained 256 nodes, and therefore the 256 averaged nodal outputs formed an average representation of "dog." The process was repeated with the correctly classified pre-training examples labeled "cat" to form an average representation of "cat."

Figure 5:
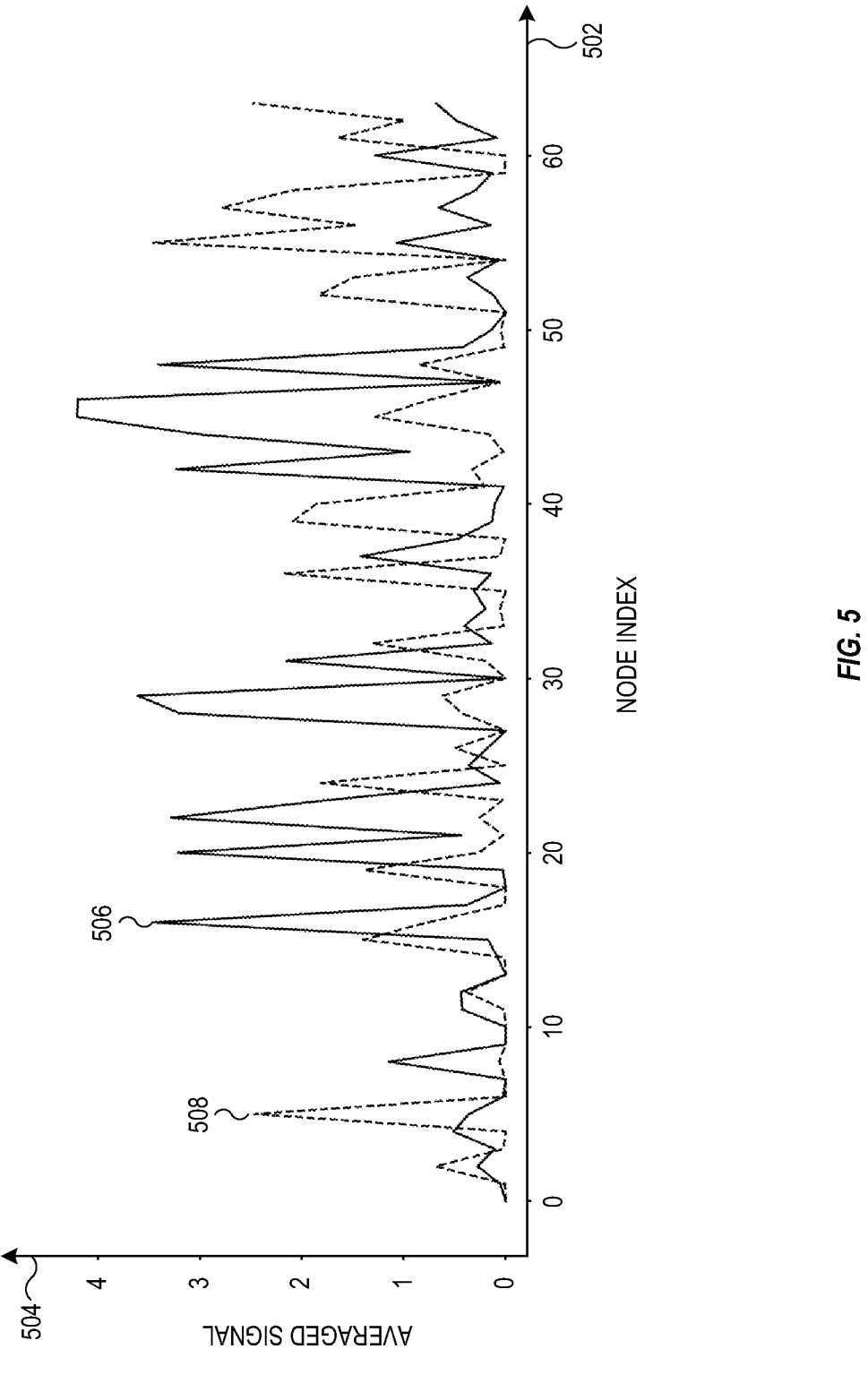
FIG. 5 is a plot of the average representations of "cat" and "dog" obtained from correctly classified examples, in an embodiment.

FIG. 5 is a plot of the average representations of "cat" and "dog" obtained from the correctly classified pre-training examples. The output nodes of the feature sub-network (e.g., sub-network output nodes 204) were indexed, starting from 0, and each non-negative integer of an x-axis 502 represents the index of one of the output nodes. A y-axis 504 represents the output signal of the node, averaged over all of the correctly classified pre-training examples (e.g., averaged feature signals 210). For clarity, only the first sixty-five nodes are shown in FIG. 3. A solid line 506 shows averaged signals obtained from correctly classified pre-training examples labeled "dog," and a dashed line 508 shows averaged signals obtained from correctly classified pretraining examples labeled "cat."

In FIG. 5, solid line 506 and dashed line 508 are readily distinguishable, and therefore the output of the feature sub-network may be used to identify between "cat" and "dog" without the dense sub-network. To verify the robustness of this distinguishability, the test data set was inputted to the CNN to identify correctly classified test examples. Correctly classified test examples labeled "dog" were then inputted to the feature sub-network to generate a second average representation of "dog," and correctly classified test examples labeled "cat" were inputted to the feature sub-network to generate a second average representation of "cat."

Figure 6:
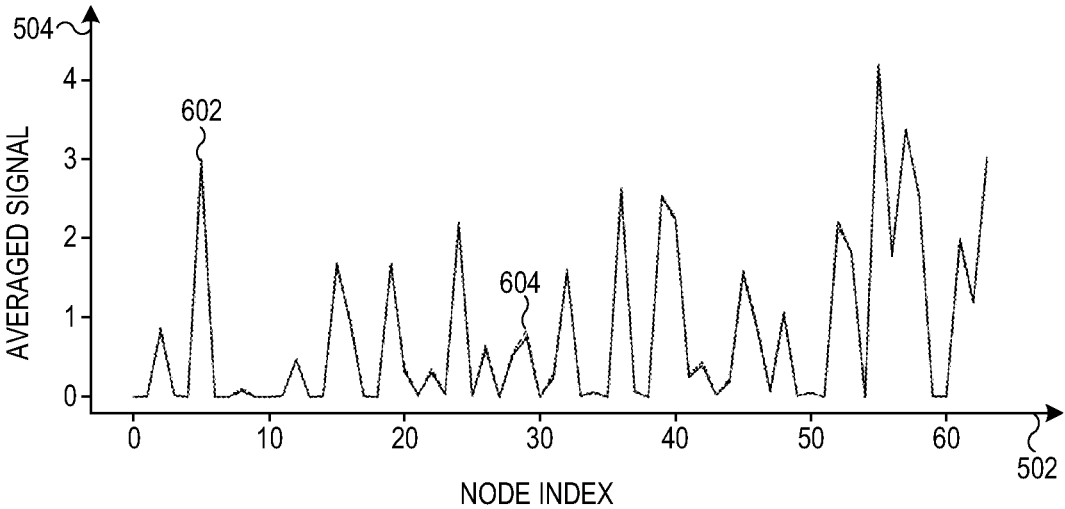
FIG. 6 is a plot comparing the average representations of "cat" obtained from correctly classified pre-training examples and correctly classified test samples, in an embodiment.

FIG. 6 is a plot comparing the average representations of "cat" obtained from the correctly classified pre-training examples and the correctly classified test examples. A solid line 602 is the average representation of "cat" obtained from the correctly classified pre-training examples (i.e., dashed line 508 of FIG. 5) and a dashed line 604 is the average representation of "cat" obtained from the correctly classified test examples. Solid line 602 and dashed line 604 agree well with each other, demonstrating robustness and repeatability of the average representation of "cat."

Figure 7:
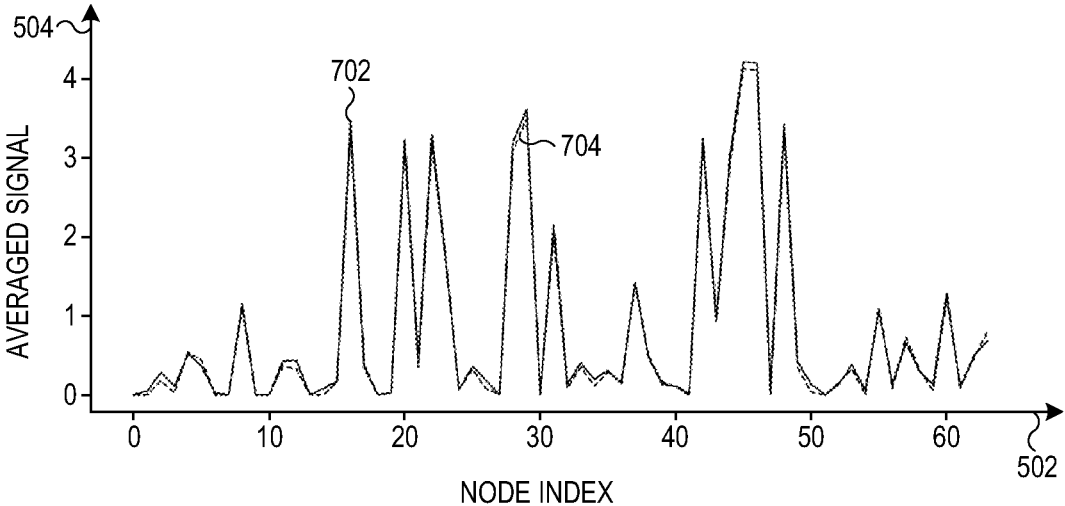
FIG. 7 is a plot comparing the average representations of "dog" obtained from the correctly classified pre-training examples and the correctly classified test samples, in an embodiment.

FIG. 7 is a plot comparing the average representations of "dog" obtained from the correctly classified pre-training examples and the correctly classified test examples. A solid line 702 is the average representation of "dog" obtained from the correctly classified pre-training examples (i.e., solid line 506 of FIG. 5) and a dashed line 704 is the average representation of "dog" obtained from the correctly classified test examples. Solid line 702 and dashed line 704 agree well with each other, demonstrating robustness and repeatability of the average representation of "dog."

Each correctly classified pre-training example was then relabeled with the average representation of the class to which the example belongs (e.g., step 410 of method 400). The feature sub-network was then trained using the relabeled examples (e.g., step 412 of method 400). Finally, the feature sub-network, after training with the relabeled examples, was joined with the dense sub-network (e.g., step 414 of method 400) to form a feature-trained CNN having the same data flow as the pre-trained CNN.

Using the full test data set, the classification accuracy of the feature-trained CNN was found to be 83%, or eight percentage points higher than the classification accuracy of the pre-trained CNN. It should be appreciated that this improvement in classification accuracy was obtained without using any additional training examples, thereby demonstrating that the embodiments presented herein advantageously utilize training examples more efficiently than conventional training methods.

Implementation

Figure 8:
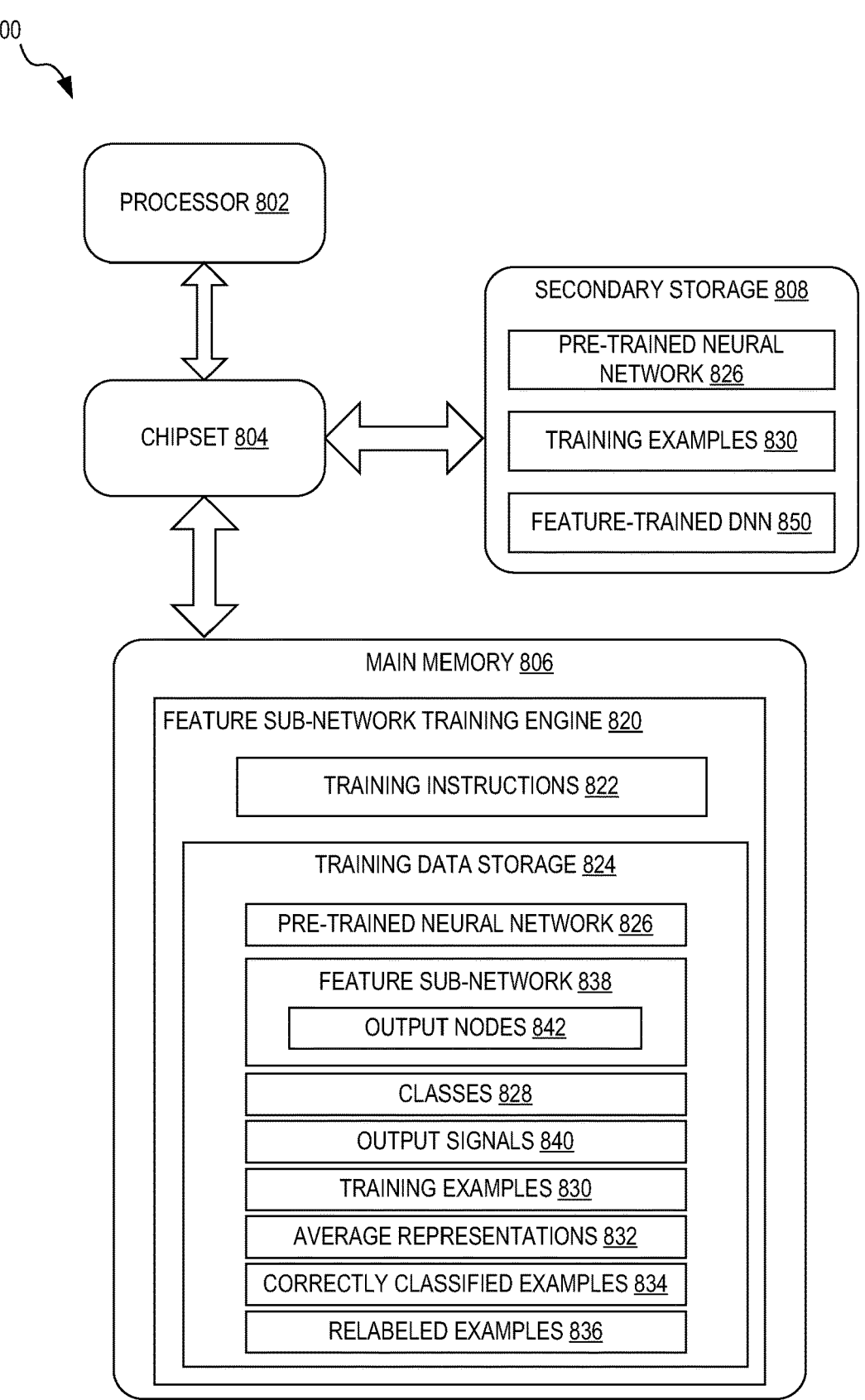
FIG. 8 shows one example of a computing system on which embodiments described herein may be implemented.

FIG. 8 shows one example of a computing system 800 on which embodiments described herein may be implemented. Computing system 800 includes a processor 802, chipset 804, main memory 806, and secondary storage 808. Main memory 806 is faster and has a smaller capacity than secondary storage 808. For example, main memory 806 may be RAM located proximate to processor 802, and secondary storage 808 may be a hard disk drive or solid-state drive. Other forms of main memory 806 and/or secondary storage 808 may be used without departing from the scope hereof.

Processor 802 may include one or more cores, cache memory, a memory management unit, and other components for assisting processor 802 with carrying out machine-readable instructions. For example, processor 802 may be a central processing unit (CPU), graphics processing unit (GPU), field-programmable gate array (FPGA), or system-on-chip (SoC). Chipset 804 manages data flow between processor 802, main memory 806, and secondary storage 808, and may be a single chip or multiple chips (e.g., northbridge and southbridge chips). Chipset 804 may also be integrated onto the same chip as processor 802, wherein processor 802 connects directly to main memory 806 and secondary storage 808.

Main memory 806 stores machine-readable instructions to be executed by processor 802, and data needed by processor 802 for executing the machine-readable instructions. For example, main memory 806 is shown in FIG. 8 storing a feature sub-network training engine 820 having machine-readable training instructions 822. Feature subnetwork training engine 820 also includes training data storage 824 that stores a pre-trained neural network 826, a feature sub-network 838, classes 828, output signals 840, training examples 830, average representations 832, correctly classified examples 834, and relabeled examples 836. Classes 828 are those classes that pre-trained neural network 826 was pre-trained to identify. Thus, each of training examples 830 is labeled with one of classes 828.

Training instructions 822 may control computing system 800 to retrieve a portion of pre-trained neural network 826 and/or training examples 830 from secondary storage 808 when pre-trained neural network 826 and/or training examples 830 are too big to fit entirely in main memory 806. Other data may be similarly stored in, and retrieved from, secondary storage 808 when too big to fit entirely in main memory 806 (e.g., correctly classified examples 834, relabeled examples 836). Training instructions 822 may also control computing system 800 to store a feature-trained DNN 850 on secondary storage 808, wherein feature-trained DNN 850 may be subsequently accessed and utilized to perform machine-learning tasks (e.g., classification).

In one embodiment, training instructions 822, when executed by processor 802, control computing system 800 to determine correctly classified examples 834 of pre-trained neural network 826, thereby implementing step 404 of method 400. Correctly classified examples 834 may be formed from training examples 830 by identifying which of training examples 830 are correctly classified by pre-trained neural network 826. Training instructions 822 further control computing system 800 to extract, from pre-trained neural network 826, feature sub-network 838 having a plurality of sub-network output nodes 842, thereby implementing step 406 of method 400. Training instructions 822 further control computing system 800 to average, for each class 828 identifiable by pre-trained neural network 826, output signals 840 from each of sub-network output nodes 842 to form one average representation 832 of said each class 828, thereby implementing step 408 of method 400. Each of output signals 840 is generated by inputting one of correctly classified examples 834 of said each class 828 into feature sub-network 838. Training instructions 822 further control computing system 800 to form relabeled examples 836 by relabeling each of correctly classified examples 834 with the average representation 832 of the class 828 to which said each of the correctly classified examples 834 belongs, thereby implementing step 410 of method 400. Training instructions 822 further control computing system 800 to train feature sub-network 838 with relabeled examples 836, thereby implementing step 412 of method 400.

In one embodiment, training instructions 822 further control computing system 800 to join feature sub-network 838 with a remaining dense sub-network of pre-trained neural network 826 to form feature-trained DNN 850, thereby implementing step 414 of method 400. In another embodiment, training instructions 822 control computing system 800 to generate pre-trained neural network 826 by pre-training an untrained neural network with training examples 830, thereby implementing step 402 of method 400.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A neural network classification method, comprising:
   determining a plurality of classified examples of a trained neural network;
   extracting, from the trained neural network, a feature network having a plurality of network output nodes;

averaging, for each class of a plurality of classes identifiable by the trained neural network, a plurality of output signals from a same output node of the plurality of network output nodes to form one of a plurality of averaged signals associated with each of the plurality of network output nodes, each of the plurality of output signals generated by inputting a different one of the plurality of classified examples of the class into the feature network;
   forming a plurality of labeled examples by labeling each classified example, of the plurality of classified examples, based at least in part on the plurality of averaged signals associated with the plurality of network output nodes; and
   training the feature network with the plurality of labeled examples.

2. The method of claim 1, further comprising joining the feature network, after the training, with another network of the trained neural network.

3. The method of claim 1, further comprising:
   inputting a plurality of examples to the trained neural network; and
   comparing, for each example of the plurality of examples, a corresponding output of the trained neural network to a label associated with one or more of the plurality of examples.

4. The method of claim 1, further comprising generating the trained neural network by training an untrained neural network with the plurality of classified examples.

5. The method of claim 4, wherein training the untrained neural network includes training the untrained neural network to a selected level of classification accuracy.

6. The method of claim 1, wherein said training the feature network includes training the feature network via backpropagation.

7. The method of claim 1, wherein:
   the trained neural network includes one or more hidden layers; and
   extracting the feature network includes selecting one of the hidden layers as an output layer of the feature network,
   the method further comprising joining the feature network, after training, with the one of the hidden layers.

8. The method of claim 1, at least one of a plurality of layers of the feature network is a sparsely connected layer.

9. The method of claim 1, at least one of a plurality of layers of the feature network is a convolutional layer.

10. The method of claim 1, further comprising joining the feature network, after training, with the trained neural network; wherein:
   layers of the trained neural network following an output layer of the feature network form a dense network; and
   at least one of the layers of the dense network is a fully connected layer.

11. A neural network classification system, comprising:
   storage to store a trained neural network;
   a processor;
   and a network training engine, implemented as machine-readable instructions stored in a memory in electronic communication with the processor, that, when executed by the processor, control the system to:
      determine a plurality of classified examples of the trained neural network,
      extract, from the trained neural network, a feature network having a plurality of network output nodes,
      average, for each class of a plurality of classes identifiable by the trained neural network, a plurality of output signals from a same output node of the plurality of network output nodes to form one of a plurality of averaged signals associated with each of the plurality of network output nodes, each of the plurality of output signals generated by inputting a different one of the plurality of classified examples of the class into the feature network, form a plurality of labeled examples by labeling each classified example, of the plurality of classified examples, based at least in part on one or more of the plurality of averaged signals associated with one or more of the plurality of network output nodes, and train the feature network with the labeled examples.

12. The system of claim 11, wherein the network training engine includes additional machine-readable instructions that, when executed by the processor, control the system to join the feature network with another network of the trained neural network.

13. The system of claim 11, wherein the machine-readable instructions that, when executed by the processor, control the system to determine the classified examples include machine-readable instructions that, when executed by the processor, control the system to:

input a plurality of examples to the trained neural network, and compare, for each example of the plurality of input examples, a corresponding output of the trained neural network to a label associated with one or more of the plurality of examples.

14. The system of claim 11, the network training engine including additional machine-readable instructions that, when executed by the processor, control the system to generate the trained neural network by training an untrained neural network with the plurality of classified examples.

15. The system of claim 14, wherein the machine-readable instructions that, when executed by the processor, control the system to train the untrained neural network include machine-readable instructions that, when executed by the processor, control the system to train the untrained neural network to a selected level of training accuracy.

16. The system of claim 11, wherein the machine-readable instructions that, when executed by the processor, control the system to train the feature network include machine-readable instructions that, when executed by the processor, control the system to train the feature network via back-propagation.

17. The system of claim 11, wherein:

the trained neural network includes one or more hidden layers; and the machine-readable instructions that, when executed by the processor, control the system to extract the feature network include machine-readable instructions that, when executed by the processor, control the system to select one of the one or more of the hidden layers as an output layer of the feature network; and join the feature network, after training, with the one or more of the hidden layers.

18. The system of claim 11, wherein at least one of a plurality of layers of the feature network is sparsely connected layer.

19. The system of claim 11, wherein at least one of a plurality of layers of the feature network is a convolutional layer.

20. The system of claim 11, further comprising machine-readable instructions that, when executed by the processor, control the system to join the feature network, after the training, with the trained neural network;

wherein:

layers of the trained neural network following an output layer of the feature network form a dense network; and at least one of the layers of the dense network is a fully connected layer.

\* \* \* \* \*